United States Patent
MacDonald et al.

(10) Patent No.: US 9,581,128 B2
(45) Date of Patent: Feb. 28, 2017

(54) SYSTEMS AND METHODS FOR WAVE ENERGY CONVERSION

(71) Applicants: Daniel G. MacDonald, Mashpee, MA (US); Justin Cantara, Fall River, MA (US); Craig Nathan, Andover, MA (US); Amy M. Lopes, New Bedford, MA (US); Brandon E. Green, Fall River, MA (US)

(72) Inventors: Daniel G. MacDonald, Mashpee, MA (US); Justin Cantara, Fall River, MA (US); Craig Nathan, Andover, MA (US); Amy M. Lopes, New Bedford, MA (US); Brandon E. Green, Fall River, MA (US)

(73) Assignee: University of Massachusetts, Boston, MA (US)

(*) Notice: Subject to any disclaimer, the term of this patent is extended or adjusted under 35 U.S.C. 154(b) by 67 days.

(21) Appl. No.: 14/402,392

(22) PCT Filed: May 24, 2013

(86) PCT No.: PCT/US2013/042597
§ 371 (c)(1),
(2) Date: Nov. 20, 2014

(87) PCT Pub. No.: WO2013/177491
PCT Pub. Date: Nov. 28, 2013

(65) Prior Publication Data
US 2015/0275846 A1   Oct. 1, 2015

Related U.S. Application Data

(60) Provisional application No. 61/651,814, filed on May 25, 2012.

(51) Int. Cl.
F03B 13/16 (2006.01)
F03B 13/18 (2006.01)

(52) U.S. Cl.
CPC .......... *F03B 13/16* (2013.01); *F03B 13/1855* (2013.01); *F05B 2260/302* (2013.01); *Y02E 10/38* (2013.01)

(58) Field of Classification Search
CPC ....... F03B 13/16; F03B 13/20; F03B 13/1855
USPC ..................................... 290/42, 53
See application file for complete search history.

(56) References Cited

U.S. PATENT DOCUMENTS

| | | |
|---|---|---|
| 3,964,264 A | 6/1976 | Tornabene |
| 7,298,054 B2 | 11/2007 | Hirsch |
| 7,385,301 B2 | 6/2008 | Hirsch |
| 7,726,123 B2 | 6/2010 | Johnson |
| 7,785,163 B2 | 8/2010 | Spencer et al. |
| 8,763,389 B2* | 7/2014 | Stewart .................. F03B 13/00 290/42 |
| 2008/0309088 A1* | 12/2008 | Agamloh ............ F03B 13/1845 290/53 |

(Continued)

*Primary Examiner* — Tulsidas C Patel
*Assistant Examiner* — Sean Gugger
(74) *Attorney, Agent, or Firm* — Burns & Levinson LLP; Orlando Lopez

(57) ABSTRACT

Systems for wave energy conversion that have components that can survive the harsh marine environment and that can be attached to fixed structures, such as a pier, and having the ability to naturally adjust for tidal height and methods for their use are presented.

23 Claims, 11 Drawing Sheets

(56) References Cited

U.S. PATENT DOCUMENTS

| | | | |
|---|---|---|---|
| 2009/0127858 A1 | 5/2009 | Houser et al. | |
| 2009/0146429 A1* | 6/2009 | Protter | F03B 13/16 290/53 |
| 2009/0251258 A1* | 10/2009 | Rhinefrank | F03B 13/20 335/306 |
| 2010/0219633 A1 | 9/2010 | Sichau et al. | |
| 2011/0042949 A1* | 2/2011 | Laz | F03B 13/20 290/42 |
| 2011/0884488 | 4/2011 | Eder et al. | |
| 2012/0248769 A1* | 10/2012 | Laz | F03B 13/20 290/42 |
| 2013/0093190 A1* | 4/2013 | Laz | F03B 13/20 290/53 |
| 2014/0132003 A1* | 5/2014 | Hayashi | F03B 13/20 290/53 |
| 2014/0197637 A1* | 7/2014 | Nakano | F03B 13/1845 290/42 |

* cited by examiner

SYSTEMS AND METHODS FOR WAVE ENERGY CONVERSION

CROSS-REFERENCE TO RELATED APPLICATIONS

This application is a U.S. national stage application under 35 U.S.C. 371 of co-pending International Application No. PCT/US13/42597 filed on May 24, 2013 and entitled SYSTEMS AND METHODS FOR WAVE ENERGY CONVERSION, which in turn claims priority to U.S. Provisional Patent Application No. 61/651,814 filed on May 25, 2012, which is incorporated by reference herein in its entirety for all purposes.

STATEMENT OF FEDERALLY SPONSORED RESEARCH OR DEVELOPMENT

A portion of this invention was made under U.S. Department of Energy Grant No. ST#106801. The government may have certain rights in the invention.

BACKGROUND

This invention relates generally to methods and systems for capturing the energy of fluid waves in a basin, such as, for example, ocean waves.

A variety of technologies have been proposed to capture energy from ocean waves; however, each is in too early a stage of development to predict which technology would be most prevalent to future commercialization. Wave energy conversion technology exists today primarily in the research and development stage, and the state of the technology is commonly considered to be one to two decades behind the development of wind energy. Although wave energy research has been ongoing for the past several decades, primarily in the United Kingdom, wave energy research has lagged significantly behind wind energy due to funding and other political constraints. At the present time, there are no commercially operating wave energy facilities in the world, with the exception of the Pelamis wave energy converter (WEC), which has had limited commercial scale implementation off the coast of Portugal.

There are many approaches to wave energy conversion currently being tested in research facilities around the world. In general, these can be separated into several broad classes of devices:

Oscillating Water Columns—these devices utilize an enclosed box with its bottom open to the ocean. Water entering the box associated with the crest of the wave pushes air out through a small conduit, which is used to drive a turbine producing electricity. As the wave recedes, air is drawn into the box through the same (or a separate) conduit, again driving a turbine to produce electricity.

Overtopping Devices—these devices allow incoming waves to break over the top edge of the device leaving water trapped in a small reservoir. As the water drains, it turns a turbine, creating electricity.

Point Absorbers—these are moored devices, or buoys, that move up and down on the water surface. There are several methods of converting the up and down motion of the point absorber to electricity. One commonly used approach is the linear generator/buoy configuration, which uses an electric coil that surrounds a metal rod connected to a permanent magnet linear generator. This type of device is often configured on a buoy that floats out in the open ocean, but can also be configured with part of the device attached to a fixed platform. The devices described hereinbelow are point absorber technologies, with a novel method for converting the up and down motion of the buoy to electricity, as described below.

Oscillating Wave Surge Converters—these can be thought of us submerged flappers that move back and forth as a wave passes. This flapping motion is then converted to electricity through a variety of methods. Sometimes the motion is used to pump seawater to shore where the electrical generating process takes place.

Submerged Pressure Differential Devices—similar to the surge converters, these devices use pressure differences on the seafloor as a wave passes to pump seawater which can then be used to drive a turbine.

Attenuators—these devices float at the surface with a number of joints. As the device flexes due to surface wave action, pistons within the joints drive high pressure oil through hydraulic motors which then drive turbines to produce electricity. The Pelamis system, operating off the coast of Portugal, is an example of attenuator technology.

There is a need for systems for wave energy conversion that have components that can survive the harsh marine environment. There is also a need for systems that can be deployed off fixed structures such as a pier and have the ability to naturally adjust for tidal height.

BRIEF SUMMARY

Systems for wave energy conversion that have components that can survive the harsh marine environment and that can be attached to fixed structures, such as a pier, and have the ability to naturally adjust for tidal height and methods for their use are presented hereinbelow.

In one or more embodiments, the system of these teachings includes a structure, the structure being substantially stationary in response to wave motion in a wave medium, where the structure includes a rotating component in a linear to rotary convertor, the rotating component being operatively connected to an electricity generating component, a linear motion component operatively connected to the rotating component and configured such that motion of the linear motion component results in or from rotation of the rotating component and a first force field generating component operatively connected to the linear motion component. In those embodiments, the system also includes a float member at least partially surrounding a portion of the structure, the float member moving substantially vertically in response to a wave moving through the wave medium wherein the float member includes a second force field generating component, the first force field generating component and the second force field generating component configured to substantially prevent rotation of the linear motion component and to hold the linear motion component substantially stationary with respect to the float member; rotation of the rotating component results from the motion induced by motion of the float member.

In one or more instances, the system of these teachings includes a structure, the structure being substantially stationary in response to wave motion in a wave medium where the structure includes a lead screw configured to be rotatable, the lead screw being operatively connected to an electricity generating component, a lead nut disposed on the lead screw and configured such that motion of the lead nut results in or from rotation of the lead screw and a first force field generating component operatively connected to the lead nut. In those embodiments, the system also includes a float member at least partially surrounding a portion of the structure, the float member moving substantially vertically in response to a wave moving through the wave medium wherein the float member includes a second force field generating component, the first force field generating component and the second force field generating component configured to substantially prevent rotation of the lead nut and to hold the lead nut substantially stationary with respect to the float member; the lead screw being disposed substantially in a vertical direction defined by motion of the float member in response to the wave moving through the wave medium.

In one or more embodiments, the method of these teachings includes providing a wave energy conversion apparatus including a structure, the structure being substantially stationary in response to wave motion in a wave medium wherein the structure includes a rotating component in a linear to rotary converter, the rotating component being operatively connected to an electricity generating component and a linear motion component in the linear to rotary converter, and a float member at least partially surrounding a portion of the structure, the float member moving substantially vertically in response to a wave moving through the wave medium. In those embodiments, the method also includes holding the linear motion component substantially stationary with respect to the float member, whereby vertical motion of the float member causes the rotating component to rotate and drive the electricity generating component, thereby converting wave energy into electrical energy.

In one or more embodiments, the method of these teachings includes providing a wave energy conversion apparatus including a structure, the structure being substantially stationary in response to wave motion in a wave medium wherein the structure includes a lead screw configured to be rotatable, the lead screw being operatively connected to an electricity generating component and a lead nut disposed on the lead screw and configured such that motion of the lead nut results in/from rotation of the lead screw, and a float member at least partially surrounding a portion of the structure, the float member moving substantially vertically in response to a wave moving through the wave medium, the lead screw being disposed substantially in a vertical direction defined by motion of the float member in response to the wave moving through the wave medium. In those embodiments, the method also includes preventing rotation of the lead nut and holding the lead nut substantially stationary with respect to the float member, whereby vertical motion of the float member causes the lead screw to rotate and drive the electricity generating component, thereby converting wave energy into electrical energy.

For a better understanding of the present teachings, together with other and further objects thereof reference is made to the accompanying drawings and detailed description and its scope will be pointed out in the appended claims.

DETAILED DESCRIPTION

Figure 1:
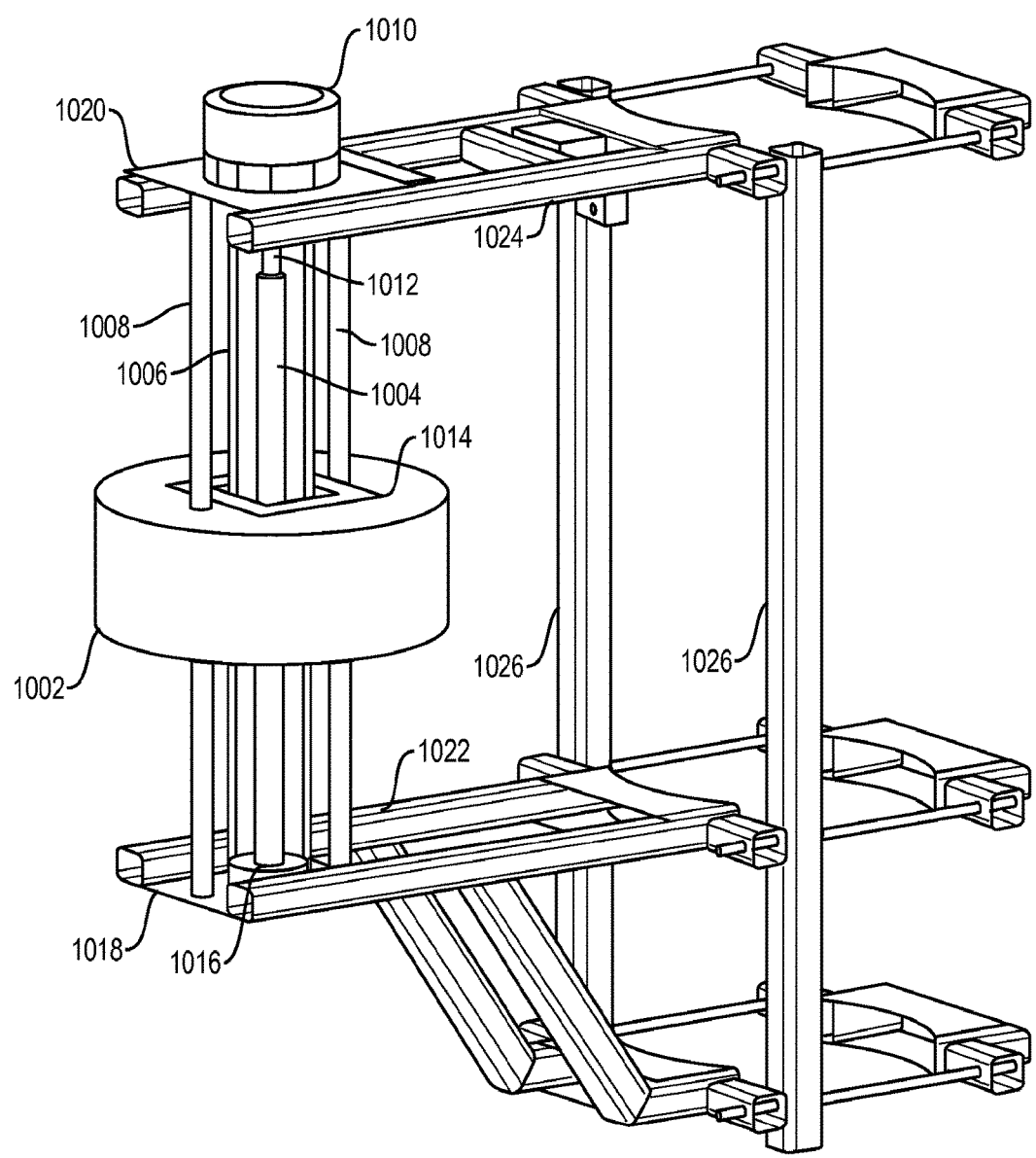
FIG. 1 is a graphical representation of a wave energy converter according to one embodiment of these teachings.

The following detailed description presents the currently contemplated modes of carrying out the invention. The description is not to be taken in a limiting sense, but is made merely for the purpose of illustrating the general principles of the invention, since the scope of the invention is best defined by the claims.

"Lead screw," as used herein, is a mechanical linear actuator that translates rotational motion to linear motion and includes both ball screws and lead screws.

"Lead nut," as used herein, is a component in a linear actuator where rotational motion is converted to linear motion or vice versa and includes the nut in a lead screw, the ball assembly in a ball screw and roller assembly in a roller screw.

In one or more embodiments, the system of these teachings includes a structure, the structure being substantially stationary in response to wave motion in a wave medium, where the structure includes a rotating component in a linear to rotary convertor, the rotating component being operatively connected to an electricity generating component, a linear motion component operatively connected to the rotating component and configured such that motion of the linear motion component results in or from rotation of the rotating component and a first force field generating component operatively connected to the linear motion component. In those embodiments, the system also includes a float member at least partially surrounding a portion of the structure, the float member moving substantially vertically in response to a wave moving through the wave medium wherein the float member includes a second force field generating component, the first force field generating component and the second force field generating component configured to substantially prevent rotation of the linear motion component and to hold the linear motion component substantially stationary with respect to the float member; rotation of the rotating component results from the motion induced by motion of the float member.

One embodiment of a linear to rotating component is a lead nut/lead screw configuration.

In that embodiment, the system of these teachings includes a structure, the structure being substantially stationary in response to wave motion in a wave medium where the structure includes a lead screw configured to be rotatable, the lead screw being operatively connected to an electricity generating component, a lead nut disposed on the lead screw and configured such that motion of the lead nut results in or from rotation of the lead screw and a first force field generating component operatively connected to the lead nut. In that embodiment, the system also includes a float member (buoy) at least partially surrounding a portion of the structure, the portion of the structure including the lead screw and lead nut, the float member moving substantially vertically in response to a wave moving through the wave medium wherein the float member includes a second force field generating component, the first force field generating component and the second force field generating component configured to substantially prevent rotation of the lead nut and to hold the lead nut substantially stationary with respect to the float member; the lead screw being disposed substantially in a vertical direction defined by motion of the float member in response to the wave moving through the wave medium.

In one instance, the force field generating components are magnetic field generating components.

In one embodiment, the float member (buoy) surrounds an inner vertical shaft in the structure. The inner vertical shaft encases a lead screw that translates vertical motion of a lead nut into rotational motion. The lead screw is operatively connected to a bearing at one end and operatively connected to an electricity generating component (such as, for example, an alternator/generator) at the other end. Connection to the electricity generating component may be made by a variety of mechanisms (for example, but not a limitation of these teachings, the mechanisms can include a clutch in order to provide unidirectional rotation to the alternator/generator). Actuation of the lead nut is achieved by introducing a force field (a magnetic field in one instance) that forces the lead nut to move substantially in unison with the buoy. Motion of the lead nut results in rotation of the lead screw, which translates into generation of electricity.

In one instance, the force field components include a number of magnets (in one embodiment, neodymium magnets) of predetermined strength. A group of magnets is located in the buoy with one pole facing towards the lead nut and another group of magnets is mounted on the lead nut with poles located so as to result in a magnetic field forcing the lead nut to move substantially in unison with the buoy and preventing the lead nut from rotating. In other embodiments, additional magnets can be placed above and/or below the group of magnets at the buoy and/or lead nut, where the additional magnets further restrain motion of the lead nut.

In one instance, the buoy is designed so that it responds efficiently to changes in the water surface due to wave action, by matching the buoyant force provided by the submerged portion of the buoy to the weight of the buoy and the resistive three of the generator under various configurations. In another instance, the buoy is designed in order to optimize the motion of the body in order to optimize energy extraction (for example, moving in resonance with the dominant wave frequency).

Figure 2A:
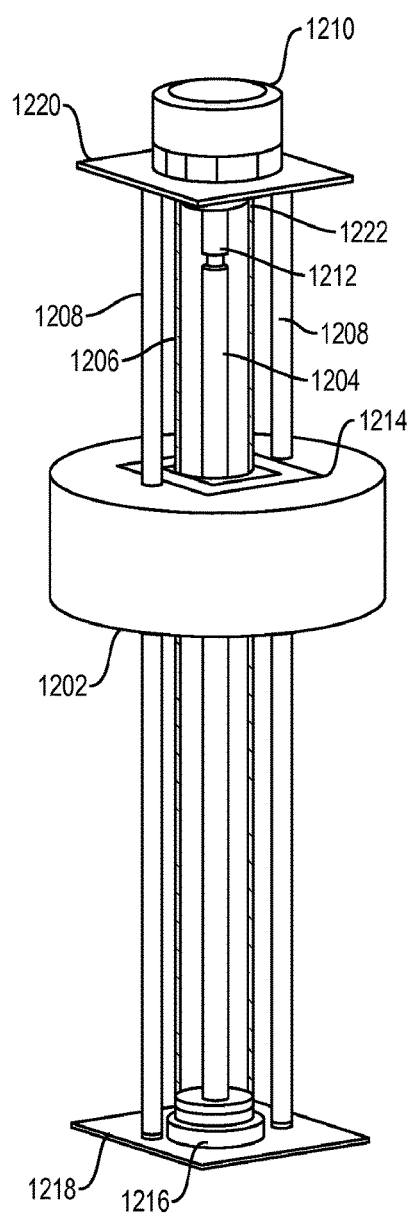
FIGS. 2a and 2b illustrate components of one embodiment of the wave energy converter of these teachings.
Figure 2B:
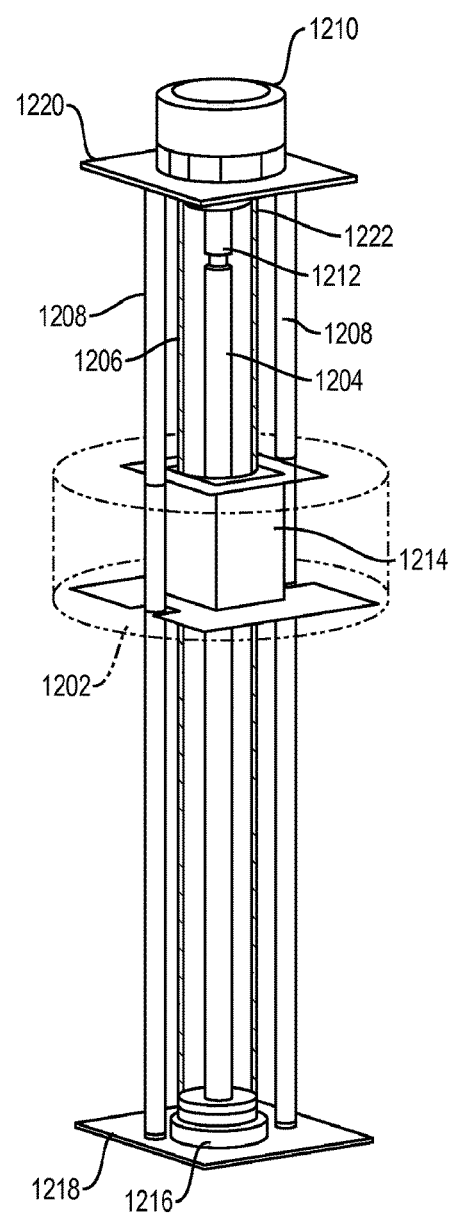

An exemplary embodiment is shown below. FIG. 1 is a graphical representation of a wave energy converter according to the exemplary embodiment. Referring to FIG. 1, the stationary structure includes a top mounting member 1024, a bottom mounting member 1022, a bottom mounting section 1018, secondary mounting rods (or tubing) 1026 and a vertical shaft 1006, with a lead screw 1004 located in the vertical shaft 1006. The lead screw 1004 is operatively connected to an alternator/generator 1010, which is mounted on structure 1020, by means of a coupling mechanism 1012 and supported by structure 1016. A buoy 1002 surrounds the vertical shaft 1006 and two secondary support rods 1008. The mounting mechanism is omitted in FIGS. 2A and 2B, in order to show the free-floating buoy 1202 and a lead screw 1204 enclosed by the center tubular structure and which is supported by a bearing at the bottom and coupled to a generator/alternator (a rotor) 1210 by means of a coupling mechanism 1212 at the top. FIG. 2B illustrates vertical shafts 1206, 1222, support rods 1208, support structures 1216, 1218, 1220, and the bracket 1014, 1214 which has been incorporated into the design to allow for an array of permanent magnets to be secured to the inside of the buoy 1202. A ferromagnetic material such as iron or steel may be used to intensify the magnetic field of the array.

Figure 3:
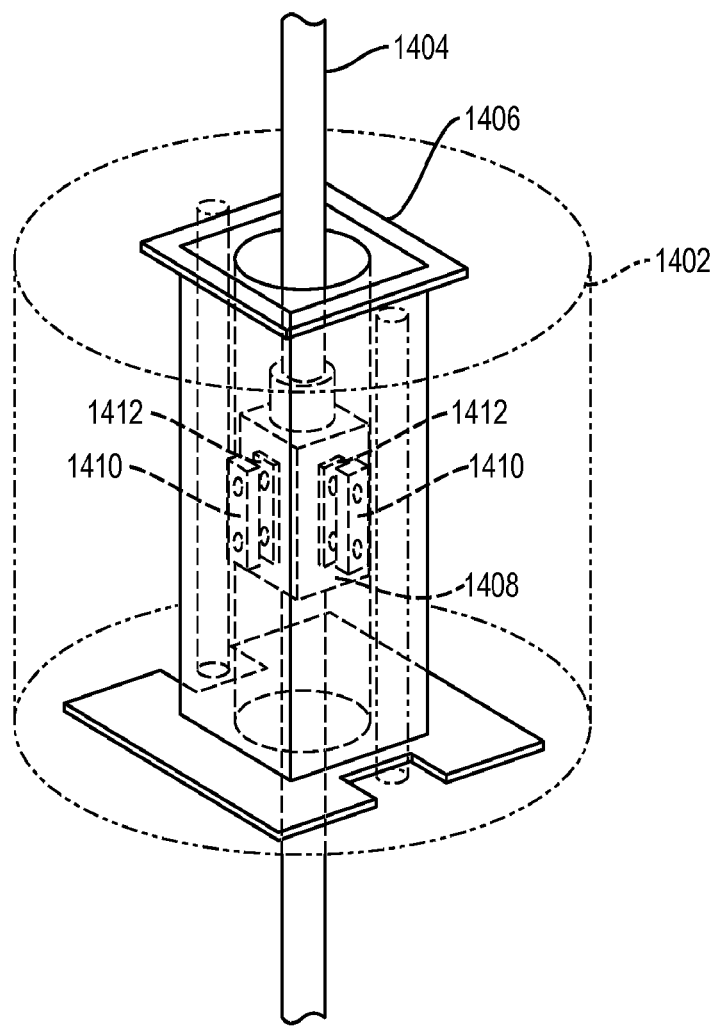
FIG. 3 illustrates other components of one embodiment of the wave energy converter of these teachings.
Figure 4A:
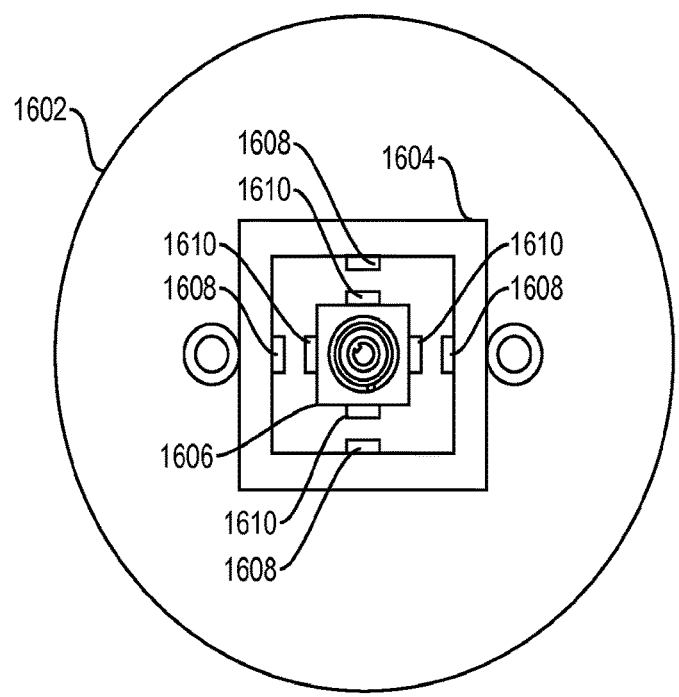
FIGS. 4a and 4b illustrate force field components in one embodiment of the wave energy converter of these teachings.
Figure 4B:
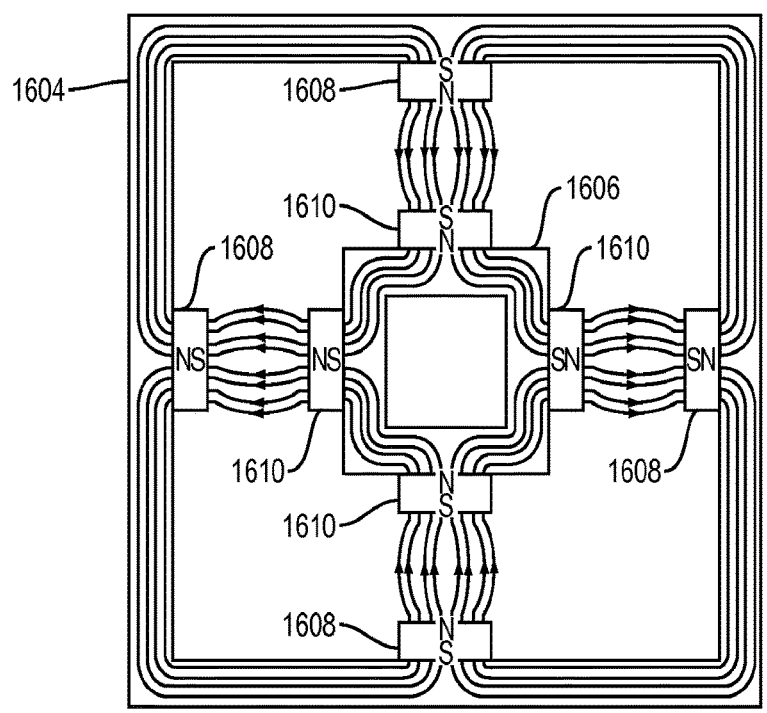

FIG. 3 illustrates, for the exemplary embodiment, the second array of permanent magnets 1412 secured onto another bracket 1408 which is fastened to the lead nut. Also shown are a lead screw 1404, the inner surface 1406 of the buoy 1402 and the permanent magnet array 1410 mounted on the inner surface 1406 of the buoy 1402. The two concentric permanent magnet arrays 1410, 1412 create an attraction force extending from the buoy 1402 to the lead nut in several directions. FIG. 4A is a top-sectional view of the magnetic system in the buoy 1602 and on the lead nut. Each array is made up of magnets 1608, 1610 which alternate in direction in order to prevent the lead nut from spinning with respect to the buoy 1602. The result of alternating poles is that a magnet 1610 on the lead nut experiences a force from adjacent magnets 1608 on the buoy 1602, forcing the lead nut in place and preventing it from spinning. FIG. 4B illustrates the fields of attraction between the two substantially concentric arrays of permanent magnets 1608, 1610 with the use of ferromagnetic cores 1606, 1604 on the buoy 1602 and lead nut.

It should be noted that these teachings are not limited only to the exemplary embodiment.

Figure 6:
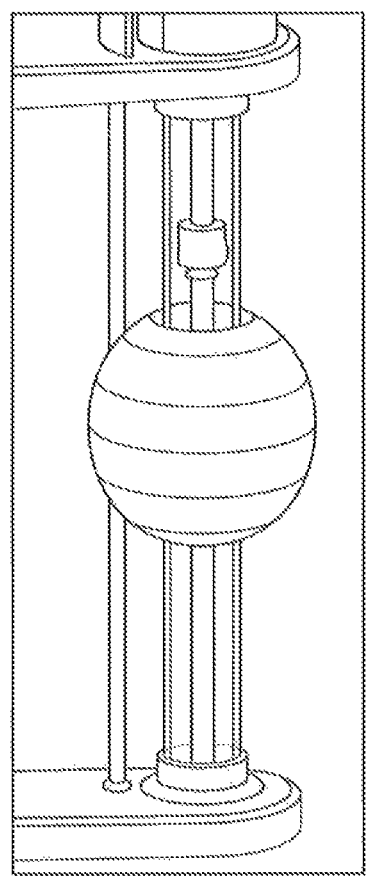
FIG. 6 illustrates another embodiment of the system of these teachings.

Another embodiment of the system of these features is shown in FIG. 6. In the embodiment shown in FIG. 6, the buoy is constrained by a second shaft offset from the center but exterior to the buoy in order to prevent rotation of the buoy.

Figure 7A:
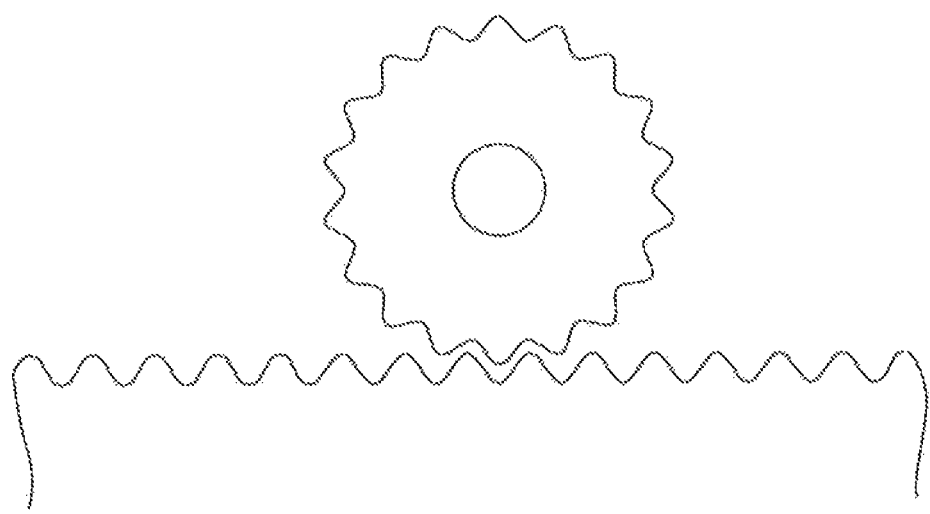
FIGS. 7a, 7b, 7c provide three examples of other linear to rotary converters that are within the scope of these teachings.
Figure 7B:
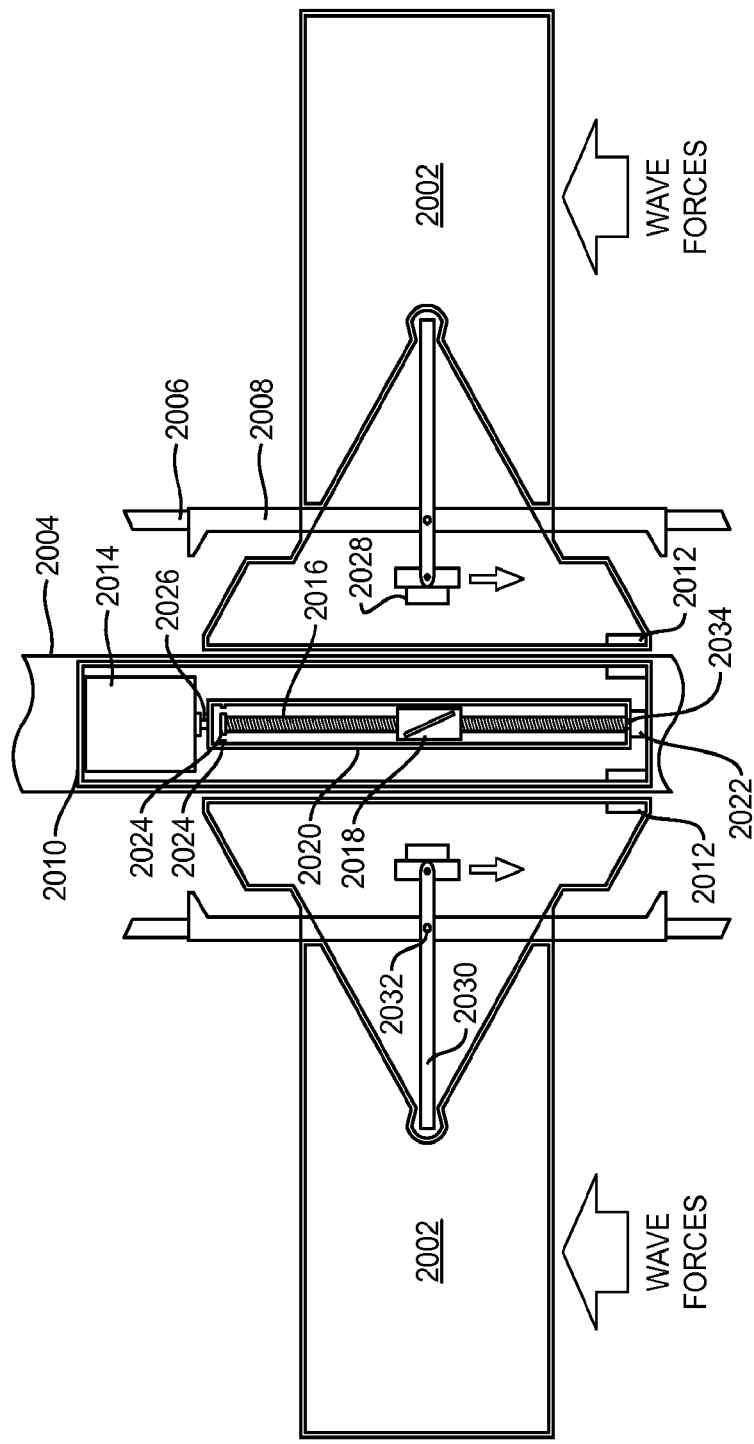

Other embodiments of the linear to rotary converter are shown in FIGS. 7*a* and 7*b*. FIG. 7*a* shows a rack and pinion linear to rotary converter and FIG. 7*b* shows a lever system. In the embodiment shown in FIG. 7*b*, a stationary (non-rotating) screw is located in the center of the tube; the nut provides the rotation, also rotating an outer housing, which is connected to a generator at the top of the screw.

In the embodiment shown in FIG. 7B, a sealed tube 2010 encompasses an alternator 2014 and actuator 2016, 2018, 2020, and the sealed tube 2010 contained within a vertical hollow structure ("shaft") 2004 along which it may slide. A system of magnets 2012 couple the buoy 2002 and the sealed tube such that vertical motion of the buoy results in equal vertical motion of the tube. A set of fixed vertical rods 2006 act as a vertical guide for the buoy. A flanged casing ("sheath") 2008 around each rod extends through the buoy. The sheath's position on the rod is maintained by friction or an alternative locking mechanism. The force of the buoy bumping against it will cause it to move only the distance it is pushed. The set of fixed sheaths provide a set of fulcrums 2032 for a set of internal levers 2030 which are magnetically coupled 2028 to the ball nut 2018 inside the sealed tube. To reinforce synchronous movement of all levers, the sheaths' flanges may be connected to form one entity.

The actuator inside the sealed tube is comprised of a ball screw 2016 whose nut 2018 is supported by a linear guide 2020 mounted on a bearing 2034. The bottom end of the screw is fixed 2022 and the free end of the screw is stabilized by a pair of repelling ring magnets 2024 (or repelling magnet structures) mounted on the outside of the ball screw and the inside of the linear guide. Linear movement of the levers about their fulcrum is translated through the magnetic coupling to the nut, which is forced to spin about the fixed screw, which, in turn forces the linear guide to rotate.

A shaft 2026 is connected to the rotating component, which drives a conventional alternator to generate electricity. Electricity generated by the alternator is conducted via a coiled cable to the end cap of the shaft.

In another embodiment, the linear to rotary converter is a piston pump driving fluid (air, water, hydraulic fluid), in a closed loop or open cycle, that then drives a turbine (see for example, http://www.pumpscout.com/articles-expert-advice/understanding-positive-displacement-pumps-aid89.html).

Figure 7C:
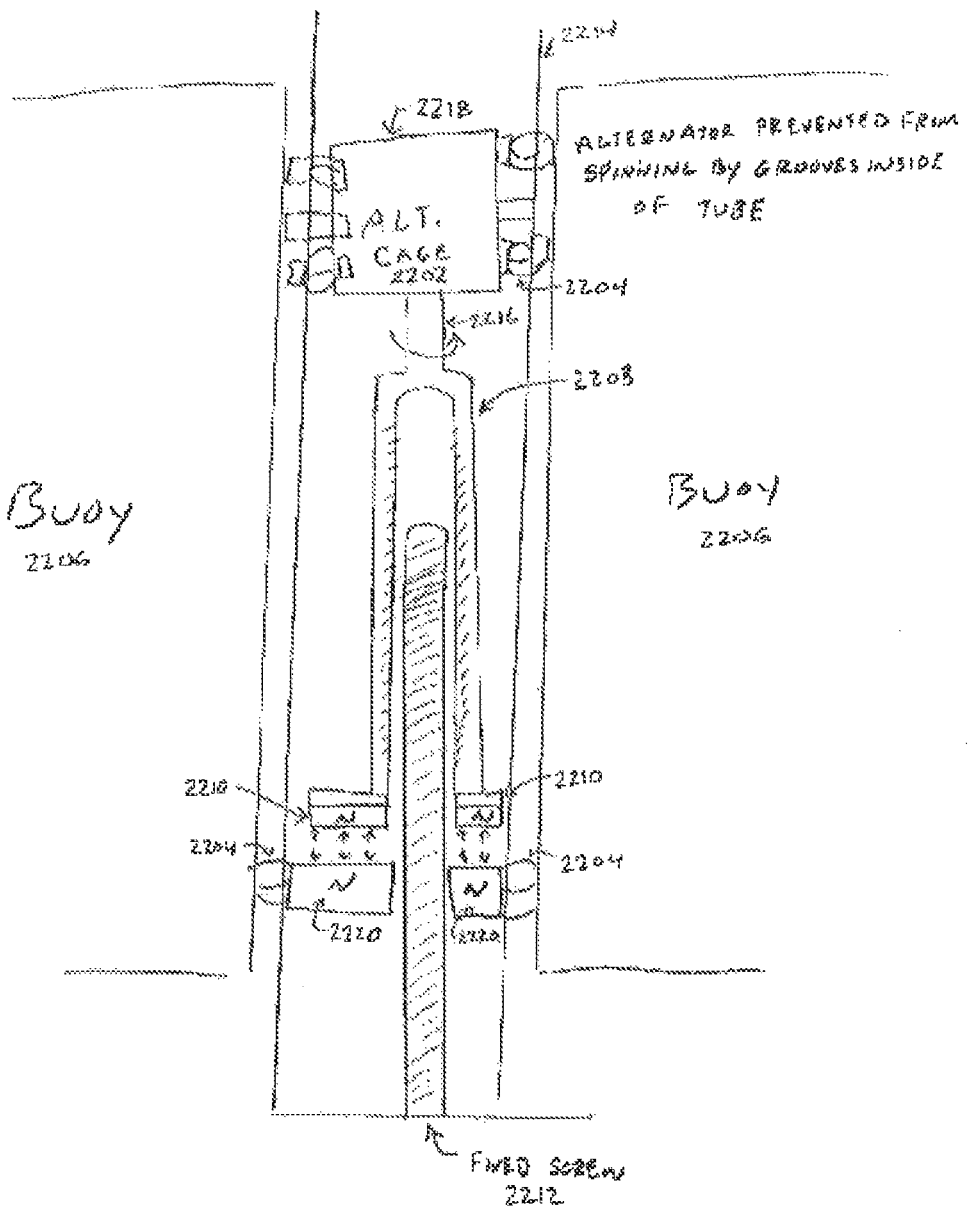

Another embodiment in which a stationary (non-rotating) screw is located in the center of the tube is shown in FIG. 7c; the nut provides the rotation, also rotating an outer housing, which is connected to a generator at the top of the screw. In the embodiment shown therein, the fixed screw is in the middle, and a threaded cap structure sits on top of it and rotates. The cap cannot be directly coupled to the buoy or there would be rotation problems, so the alternator (which would move up and down with the cap) is coupled to the buoy, and a reverse magnetic coupling is located at the bottom of the cap, which is then coupled to the buoy. The reverse magnetic coupling on the bottom allows force to be applied but both sides of the coupling don't have to rotate.

In the embodiment shown in FIG. 7C, a fixed screw 2212 is aligned with a vertical direction of the hollow structure ("shaft") 2214. A threaded cap 2208 is mated with the screw and turns as it rises and falls due to force provided from the bottom through a common polarity magnetic coupling system 2210, and from the top through bearings associated with connection between the shaft of the screw cap 2216 and an alternator 2202. The alternator cage 2218 and the bottom forcing plate 2220 are linked by a magnetic coupling system 2204 to a buoy 2206, which enables the transfer of buoy motion to the components inside the shaft 2214. The alternator cage is prevented from spinning by tabs on the cage that align with grooves on the inside surface of the shaft 2214. Electricity generated by the alternator 2202 is conducted via a coiled cable to the end cap of the shaft. Alternatively, electric current can be carried to the end cap through conducting channels within the grooves on the inside surface of the shaft 2214

Figure 8:
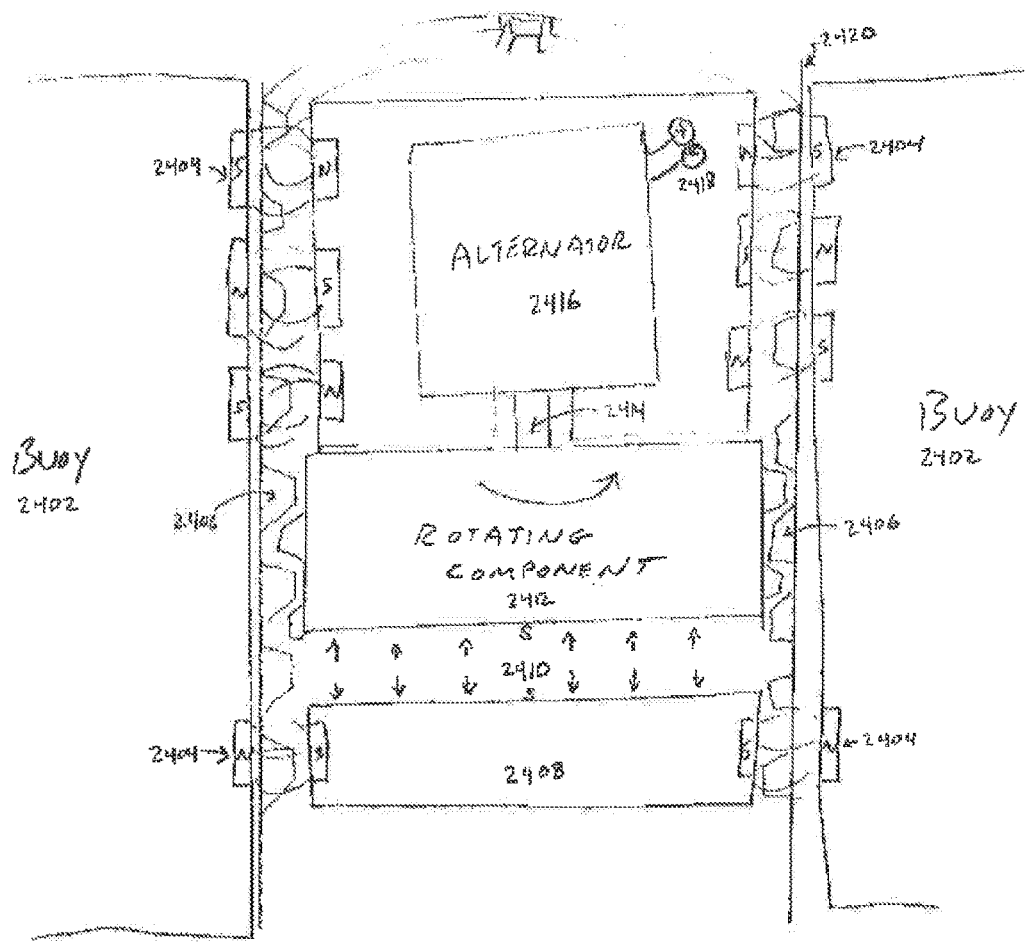
FIG. 8 shows another embodiment of the system of these teachings.

In yet another embodiment, shown in FIG. 8, the main tube has threads on the inside (in one instance, the threads are molded into the PVC or, in another instance, there is a non-magnetic insert, for example, aluminum or stainless steel insert). A disk in the middle spins in the threads when force is applied up or down. The generator is attached to this disk and travels up and down the tube with the buoy, but is kept from spinning by several grooves cut through the threads into the side of the tube. In one instance, there is a reverse magnetic coupling at the bottom (allowing one side to spin while the other does not), and a direct magnetic coupling to the buoy at the top (the generator, which is not spinning).

An alternative embodiment is shown in FIG. 8. In this embodiment, vertical motion of the buoy 2402 is transferred to the inside of the shaft 2420 through a magnetic coupling system 2404. Inside the shaft force is applied specifically to a bottom force plate 2408 and an alternator cage 2416. The bottom force plate is connected to a rotating component 2412 by a common polarity magnetic coupling system 2410 allowing the rotating component 2412 freedom to rotate. The rotating component 2412 is designed with threads on its outer circumference that mate with threads 2406 on the interior surface of the shaft 2420. The threads on the circumference of the rotating component may incorporate ball bearings or other mechanisms to reduce rotational friction. A shaft 2414 is connected to the rotating component, which drives a conventional alternator 2416 to generate electricity. The alternator cage is prevented from rotating by tabs on the cage that align with grooves on the inside surface of the shaft 2214. Electricity generated by the alternator 2416 is conducted via a coiled cable 2418 to the end cap of the shaft. Alternatively, electric current can be carried to the end cap through conducting channels within the grooves on the inside surface of the shaft 2420.

Figure 9:
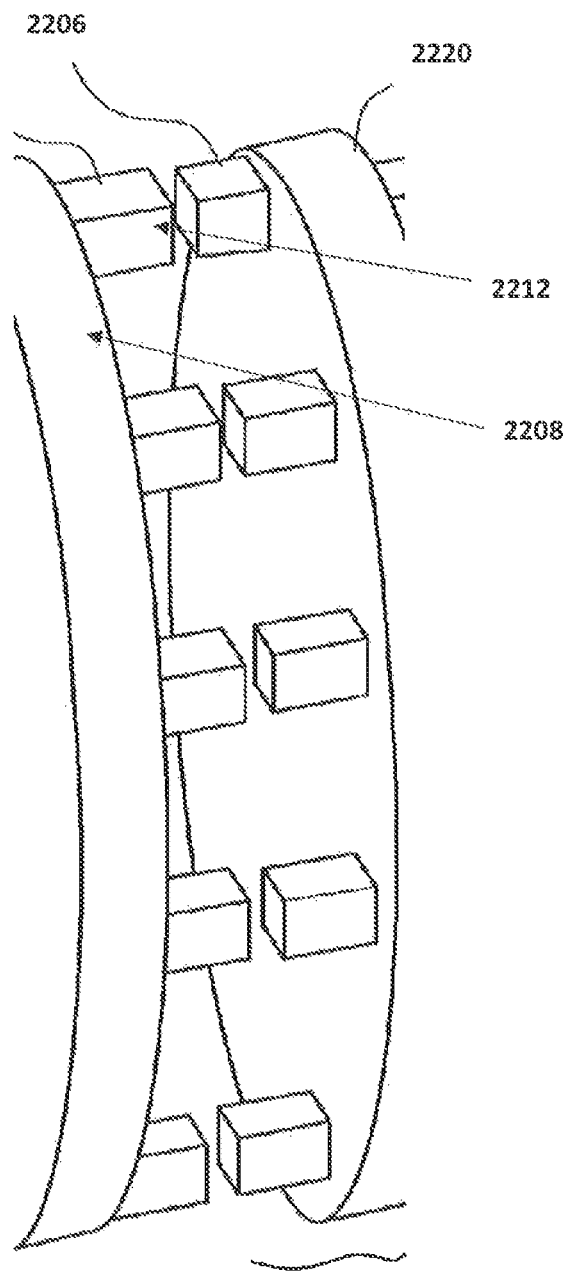
FIG. 9 shows a further component of one embodiment of the wave energy converter of these teachings.

In a number of the embodiments disclosed hereinabove, the components are separated from each other and operatively coupled. FIG. 9 shows an embodiment of a structure that holds the components separated from each other and couples the two components such that displacement of one component results in displacement of the other component. Referring to FIG. 9, in the embodiment shown therein, a first group of permanent magnet elements 2206 is disposed on a surface of one component 2220 and a second group of permanent magnet elements 2212 is disposed on a surface of another component 2208. Like poles of the of the first group of permanent magnets elements 2206 and of the second group of permanent magnet elements 2212 are opposite each other, thereby keeping the two components separated but coupled since displacement of one component towards the other component will cause displacement of the other component.

In one or more embodiments, the method of these teachings includes disposing a float member in the wave medium, a float member being configured to move substantially vertically in response to a wave moving the wave medium; the float member at least partially surrounding a portion of a structure, the structure being substantially stationary in response to wave motion in a wave medium, the structure including a rotating component in a linear to rotary converter (L-R converter), the rotating component being operatively connected to an electricity generating component, a linear motion component in the L-R converter, the linear motion components operatively connected to the rotating component; motion of the linear motion component results in or from rotation of the rotating component; and a first force field generating component operatively connected to the linear motion component, the float member including a second force field generating component, configuring the first force field generating component and the second force field generating component to hold the linear motion component substantially stationary with respect to the float member, and generating electrical energy by rotation of the rotating component driving the electricity generating component.

In one or more other embodiments, the method of these teachings includes providing a wave energy conversion apparatus including a structure, the structure being substantially stationary in response to wave motion in a wave medium wherein the structure includes a rotating component in a linear to rotary converter, the rotating component being operatively connected to an electricity generating component and a linear motion component in the linear to rotary converter, and a float member at least partially surrounding a portion of the structure, the float member moving substantially vertically in response to a wave moving through the wave medium. In those embodiments, the method also includes holding the linear motion component substantially stationary with respect to the float member, whereby vertical motion of the float member causes the rotating component to rotate and drive the electricity generating component, thereby converting wave energy into electrical energy.

In the embodiments in which the linear to rotary converter is a lead nut/lead screw configuration, the method of these teachings includes providing a wave energy conversion apparatus including a structure, the structure being substantially stationary in response to wave motion in a wave medium wherein the structure includes a lead screw configured to be rotatable, the lead screw being operatively connected to an electricity generating component and a lead nut disposed on the lead screw and configured such that motion of the lead nut results in/from rotation of the lead screw, and a float member at least partially surrounding the structure, the float member moving substantially vertically in response to a wave moving through the wave medium, the lead screw being disposed substantially in a vertical direction defined by motion of the float member in response to the wave moving through the wave medium. In those embodiments, the method also includes preventing rotation of the lead nut and holding the lead nut substantially stationary with respect to the float member, whereby vertical motion of the float member causes the lead screw to rotate and drive the electricity generating component, thereby converting wave energy into electrical energy.

Figure 5A:
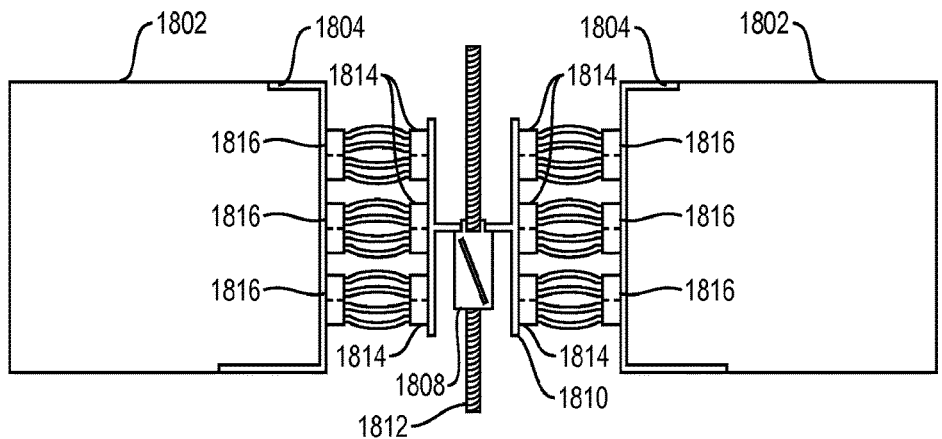
FIGS. 5a-5c illustrate the operation of one embodiment of the wave energy converter of these teachings.
Figure 5B:
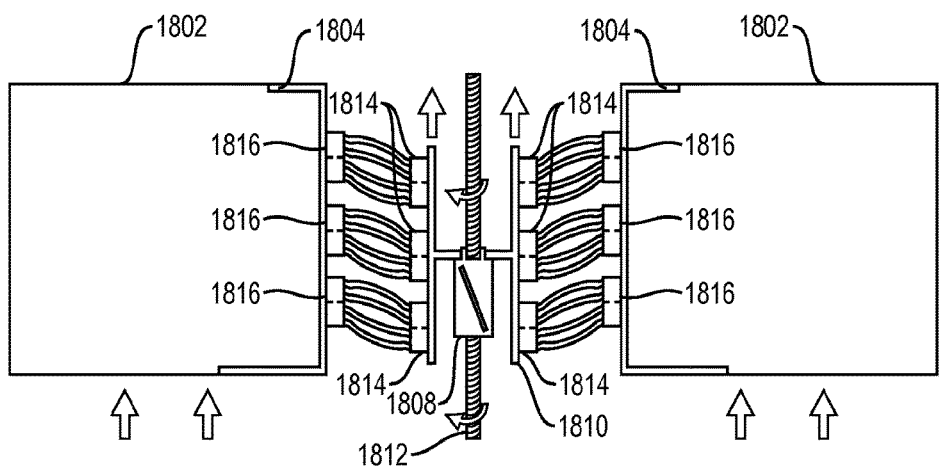
Figure 5C:
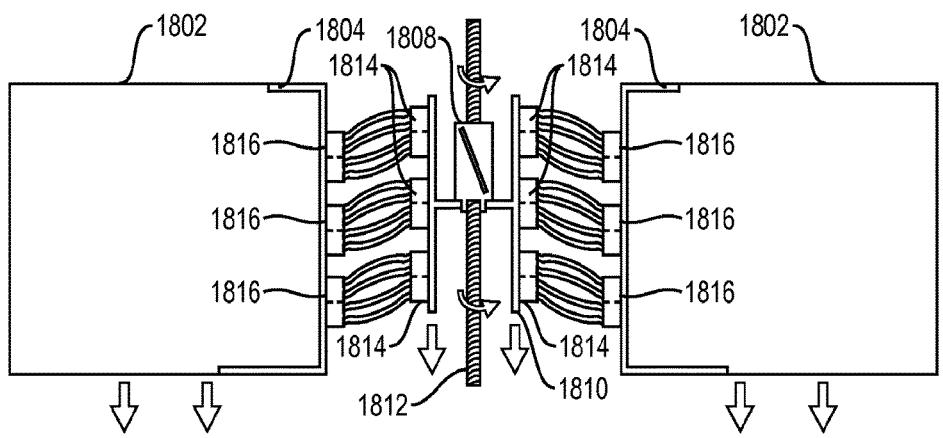

FIGS. 5A-5C illustrates the method of these teachings by illustrating the operation of the exemplary embodiment. FIG. 5A shows the magnets 1816 mounted on bracket 1804, which is located on the buoy 1802, the magnets 1814 mounted on bracket 1810, which is fastened to the lead nut 1808, and the buoy 1802 in the rest position, i.e. no waves. FIG. 5B illustrates wave forces pushing up on the buoy 1802 with arrows on the bottom of the buoy 1802. The magnetic fields, from the magnets 1814, 1816 that prevent the lead nut 1808 from spinning also pull the lead nut 1808 upward with the buoy 1802, which forces the lead screw 1812 to spin. FIG. 5C illustrates gravity pulling the buoy 1802 back down with arrows at the bottom of the buoy 1802. Again, the lead nut 1808 is pulled along by the magnetic fields and, in one embodiment, forces the lead screw 1812 to spin, in the opposite direction. Other embodiments can include mechanisms to then disengage the lead nut 1808 in order to obtain unidirectional rotation of the lead screw 1812 (see, for example, U.S. Pat. No. 3,757,591, incorporated by reference herein in its entirety and for all purposes).

For the purposes of describing and defining the present teachings, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Although the invention has been described with respect to various embodiments, it should be realized these teachings are also capable of a wide variety of further and other embodiments within the spirit and scope of the appended claims.

What is claimed is:

1. A system for generating electrical energy from wave motion in a fluid, the system comprising:
   a structure, the structure being substantially stationary in response to wave motion in a wave medium, the structure comprising:
      a rotating component in a linear to rotary convertor (L-R convertor), the rotating component being operatively connected to an electricity generating component;
      a linear motion component in the L-R convertor; the linear motion components operatively connected to the rotating component; motion of the linear motion component results in or from rotation of the rotating component; and
      a first force field generating component operatively connected to the linear motion component; and
   a float member at least partially surrounding a portion of the structure; the float member moving substantially vertically in response to a wave moving the wave medium; the float member comprising a second force field generating component; the first force field generating component and the second force field generating component configured to hold the linear motion component substantially stationary with respect to the float member;
   wherein the linear motion component comprises a substructure, the substructure comprising the first force field generating component; the first force field generating component and the second force field generating component hold said substructure substantially stationary with respect to the float member;
   wherein the rotating component comprises:
      a fixed screw disposed substantially parallel to an axis of the structure and substantially in a vertical direction defined by motion of the float member in response to the wave moving the wave medium; and
      a cap subcomponent, the cap subcomponent being disposed above and substantially surrounding the fixed screw; an interior surface of the cap subcomponent being threaded; a thread of the interior surface of the cap subcomponent being operatively connected and engaged with a thread of the fixed screw; substantially vertical motion of the cap subcomponent corresponding to rotation of the cap subcomponent; the cap subcomponent being disposed above, separated from and operatively coupled to said substructure; the cap subcomponent being operatively connected to the electricity generating component.

2. The system of claim 1 wherein the linear to rotary convertor is a nut/screw combination; the screw being operatively connected to the electricity generating component and rotatable; the nut being the linear motion component; and wherein the first force field generating component and the second force field generating component configured to substantially prevent rotation of the linear motion component.

3. The system of claim 2 wherein the nut is disposed on the screw and configured such that motion of the nut result in or from rotation of the screw; wherein the force field generating component is operatively connected to the nut; and wherein the first force field generating component and the second force field generating component are configured to substantially prevent rotation of the nut and to hold the nut substantially stationary with respect to the float member.

4. The system of claim 2 wherein the first force field generating component comprises magnetic field generating components; and wherein the second force field generating component comprises magnetic field generating components.

5. The system of claim 1 wherein the first force field generating component comprises magnetic field generating components; and wherein the second force field generating component comprises magnetic field generating components.

6. The system of claim 1 wherein the system further comprises a cage substructure; the electricity generating component being disposed inside the cage substructure; the cage substructure comprising a third force field generating component; and wherein the float member comprises a fourth force field generating component; the third force field generating component and the fourth force field generating component hold the cage substructure substantially stationary with respect to the float member.

7. The system of claim 6 wherein an exterior surface of the cage substructure comprises protrusions; said exterior surface being opposite an interior surface of said structure; and wherein at least a portion of said interior surface comprises grooves; said protrusions and said grooves being operatively connected and engaged and configured to substantially prevent rotation of said cage substructure.

8. The system of claim 6 wherein the first force field generating component comprises magnetic field generating components; wherein the second force field generating component comprises magnetic field generating components; the third force field generating component comprises magnetic field generating components; and the fourth force field generating component comprises magnetic field generating components.

9. The system of claim 1 wherein said substructure comprises one or more first permanent magnets; said one or more first permanent magnets being disposed on a surface of said substructure; said surface of said substructure being opposite a surface of said cap subcomponent; and wherein said cap subcomponent comprises one or more second permanent magnets; wherein like poles of said one or more first permanent magnets and said one or more second permanent magnets are opposite each other.

10. A system for generating electrical energy from wave motion in a fluid, the system comprising:
 a structure, the structure being substantially stationary in response to wave motion in a wave medium, the structure comprising:
  a rotating component in a linear to rotary convertor (L-R convertor), the rotating component being operatively connected to an electricity generating component;
  a linear motion component in the L-R convertor; the linear motion components operatively connected to the rotating component; motion of the linear motion component results in or from rotation of the rotating component; and
  a first force field generating component operatively connected to the linear motion component; and
 a float member at least partially surrounding a portion of the structure; the float member moving substantially vertically in response to a wave moving the wave medium; the float member comprising a second force field generating component; the first force field generating component and the second force field generating component configured to hold the linear motion component substantially stationary with respect to the float member;
 wherein the linear motion component comprises a substructure, the substructure comprising the first force field generating component; the first force field generating component and the second force field generating component hold said substructure substantially stationary with respect to the float member;
 wherein an exterior surface of the rotating component is threaded; said exterior surface being opposite an interior surface of said structure; and wherein at least a portion of said interior surface is threaded; a thread of said exterior surface and a thread of said interior surface of said structure being operatively connected and engaged; substantially vertical motion of a cap subcomponent corresponding to rotation of the cap subcomponent; the rotating component being disposed above, separated from and operatively coupled to said substructure; the rotating component being operatively connected to the electricity generating component.

11. The system of claim 10 wherein the first force field generating component comprises magnetic field generating components; and wherein the second force field generating component comprises magnetic field generating components.

12. The system of claim 10 wherein the system further comprises a cage substructure; the electricity generating component being disposed inside the cage substructure; the cage substructure comprising a third force field generating component; and wherein the float member comprises a fourth force field generating component; the third force field generating component and the fourth force field generating component hold the cage substructure substantially stationary with respect to the float member.

13. The system of claim 12 wherein the first force field generating component comprises magnetic field generating components; wherein the second force field generating component comprises magnetic field generating components; the third force field generating component comprises magnetic field generating components; and the fourth force field generating component comprises magnetic field generating components.

14. The system of claim 10 wherein said substructure comprises one or more first permanent magnets; said one or more first permanent magnets being disposed on a surface of said substructure; said surface of said substructure being opposite a surface of said rotating component; and wherein said rotating component comprises one or more second permanent magnets; wherein like poles of said one or more first permanent magnets and said one or more second permanent magnets are opposite each other.

15. A system for generating electrical energy from wave motion in a fluid, the system comprising:
 a structure, the structure being substantially stationary in response to wave motion in a wave medium, the structure comprising:
  a rotating component in a linear to rotary converter (L-R convertor), the rotating component being operatively connected to an electricity generating component;
  a linear motion component in the L-R convertor; the linear motion components operatively connected to the rotating component; motion of the linear motion component results in or from rotation of the rotating component; and
  a first force field generating component operatively connected to the linear motion component; and
 a float member at least partially surrounding a portion of the structure; the float member moving substantially vertically in response to a wave moving the wave medium; the float member comprising a second force field generating component; the first force field generating component and the second force field generating component configured to hold the linear motion component substantially stationary with respect to the float member;
 wherein the float member comprises:
 one or more rods disposed in the substantially vertical direction;
 one or more casings; each casing disposed over and fixedly attached to one of the rods; each casing comprising a fulcrum;
 one or more levers, each lever being attached to one fulcrum in a manner that allows rotation about the fulcrum; said each lever extending from a location in the float member and away from the structure to the fulcrum and from the fulcrum to a location closer to the structure; an element of the second force generating component being attached to said each lever at the location closer to the structure; and a third force generating component;

wherein the structure comprises:

a first hollow substructure;

a second hollow substructure slidably disposed inside the first hollow substructure; the second hollow substructure being substantially sealed; said second hollow substructure having a first end and a second end and comprising the electricity generating component disposed at the second end of the second hollow substructure;

a third hollow substructure; one end of the third hollow substructure being rotatably attached to the first end of the second hollow substructure; another end of the third hollow substructure being operatively connected to the electricity generating component; the third hollow substructure comprising a nut/screw combination; the screw in the nut/screw combination being fixedly attached to said one end; the nut being slidably and operatively connected to an interior of the third hollow substructure such that the nut can displace linearly along the screw and rotate, rotation of the nut transferred to the third hollow substructure; the first force generating component being attached to the nut; the nut being the linear motion component; and a fourth force generating component; the first force field generating component and the second force field generating component configured to hold the linear motion component substantially stationary with respect to the location of said each lever closer to the structure; the third force generating component and the fourth force generating component being configured to hold the second hollow substructure substantially stationary with respect to the float member.

16. The system of claim 15 wherein each casing is connected to another casing, forming a casing structure.

17. The system of claim 15 wherein one permanent magnet component is attached to the screw at an end opposite said the one end; and wherein another permanent magnet component is attached to an interior surface of the third hollow substructure at a location opposite said one permanent magnet component; like poles of said one permanent magnet component and said another permanent magnets component being opposite each other.

18. A method for generating electrical energy from wave motion in a wave medium, the method comprising:

disposing a float member in the wave medium, the float member being configured to move substantially vertically in response to a wave moving the wave medium; the float member at least partially surrounding a portion of a structure; the structure being substantially stationary in response to wave motion in a wave medium, the structure comprising:

a rotating component in a linear to rotary converter (L-R converter), the rotating component being operatively connected to an electricity generating component;

a linear motion component in the L-R convertor; the linear motion components operatively connected to the rotating component; motion of the linear motion component results in or from rotation of the rotating component; and a first force field generating component operatively connected to the linear motion component; the float member comprising a second force field generating component;

configuring the first force field generating component and the second force field generating component to hold the linear motion component substantially stationary with respect to the float member; and generating electrical energy by rotation of the rotating component driving the electricity generating component;

wherein the linear motion component comprises a substructure, the substructure comprising the first force field generating component; the first force field generating component and the second force field generating component holding said substructure substantially stationary with respect to the float member; and wherein the rotating component comprises:

a fixed screw disposed substantially parallel to an axis of the structure and substantially in the vertical direction defined by motion of the float member in response to the wave moving the wave medium;

a cap subcomponent, the cap subcomponent being disposed above and substantially surrounding the fixed screw; an interior surface of the cap subcomponent being threaded; a thread of the interior surface of the cap subcomponent being operatively connected and engaged with a thread of the fixed screw; substantially vertical motion of the cap subcomponent corresponding to rotation of the cap subcomponent; the cap subcomponent being disposed above, separated from and operatively coupled to said substructure; the cap subcomponent being operatively connected to the electricity generating component.

19. The method of claim 18 wherein the linear to rotary converter comprises a nut/screw configuration; wherein the screw is configured to be rotatable, and is operatively connected to the electricity generating component; wherein configuring the first force field generating component and the second force field generating component comprises configuring the first force field generating component and the second force field generating component to substantially prevent rotation of the linear motion component; and the method further comprises inducing screw rotation by the vertical motion of the float member and of the nut.

20. The method of claim 18 further comprising:

inducing motion of the substructure substantially in the vertical direction due to motion of the float member;

inducing substantially vertical motion of the cap subcomponent due to the motion of the substructure; and causing rotation of the cap subcomponent due to the substantially vertical motion of the cap subcomponent.

21. A method for generating electrical energy from wave motion in a wave medium, the method comprising:

disposing a float member in the wave medium, the float member being configured to move substantially vertically in response to a wave moving the wave medium; the float member at least partially surrounding in a portion of a structure; the structure being substantially stationary in response to wave motion in a wave medium, the structure comprising:

a rotating component in a linear to rotary converter (L-R converter), the rotating component being operatively connected to an electricity generating component;

a linear motion component in the L-R convertor; the linear motion components operatively connected to the rotating component; motion of the linear motion component results in or from rotation of the rotating component; and a first force field generating component operatively connected to the linear motion component; the float member comprising a second force field generating component;

configuring the first force field generating component and the second force field generating component to hold the linear motion component substantially stationary with respect to the float member; and generating electrical energy by rotation of the rotating component driving the electricity generating component;

wherein the linear motion component comprises a substructure, the substructure comprises the first force field generating component; the first force field generating component and the second force field generating component hold said substructure substantially stationary with respect to the float member;

wherein an exterior surface of the rotating component is threaded; said exterior surface being opposite an interior surface of said structure; and wherein at least a portion of said interior surface is threaded; a thread of said exterior surface and a thread of said interior surface of said structure being operatively connected and engaged; substantially vertical motion of the cap subcomponent corresponding to rotation of the cap subcomponent; the rotating component being disposed above, separated from and operatively coupled to said substructure; the rotating component being operatively connected to the electricity generating component.

22. A method for generating electrical energy from wave motion in a wave medium, the method comprising:

disposing a float member in the wave medium, the float member being configured to move substantially vertically in response to a wave moving the wave medium; the float member at least partially surrounding a portion of a structure; the structure being substantially stationary in response to wave motion in a wave medium, the structure comprising:

a rotating component in a linear to rotary converter (L-R converter), the rotating component being operatively connected to an electricity generating component;

a linear motion component in the L-R convertor; the linear motion components operatively connected to the rotating component; motion of the linear motion component results in or from rotation of the rotating component; and a first force field generating component operatively connected to the linear motion component; the float member comprising a second force field generating component;

configuring the first force field generating component and the second force field generating component to hold the linear motion component substantially stationary with respect to the float member, and generating electrical energy by rotation of the rotating component driving the electricity generating component;

wherein the float member comprises:

one or more rods disposed in the substantially vertical direction;

one or more casings; each casing disposed over and fixedly attached to one of the rods; each casing comprising a fulcrum;

one or more levers; each lever being attached to one fulcrum in a manner that allows rotation about the fulcrum; said each lever extending from a location in the float member and away from the structure to the fulcrum and from the fulcrum to a location closer to the structure; an element of the second force generating component being attached to said each lever at the location closer to the structure; and a third force generating component;

wherein the structure comprises:

a first hollow substructure;

a second hollow substructure slidably disposed inside the first hollow substructure; the second hollow substructure being substantially sealed; said second hollow substructure having a first end and a second end and comprising:

the electricity generating component disposed at the second end of the second hollow substructure;

a third hollow substructure; one end of the third hollow substructure being rotatably attached to the first end of the second hollow substructure; another end of the third hollow substructure being operatively connected to the electricity generating component; the third hollow substructure comprising a nut/screw combination; the screw in the nut/screw combination being fixedly attached to said one end; the nut being slidably and operatively connected to an interior of the third hollow substructure such that the nut can displace linearly along the screw and rotate, rotation of the nut transferred to the third hollow substructure; the first force generating component being attached to the nut; the nut being the linear motion component; and a fourth force generating component; the first force field generating component and the second force field generating component configured to hold the linear motion component substantially stationary with respect to the location of said each lever closer to the structure; the third three generating component and the fourth force generating component being configured to hold the second hollow substructure substantially stationary with respect to the float member.

23. The method of claim 22 further comprising:

displacing of the location of said each lever closer to the structure in response to float member substantially vertical motion;

inducing vertical motion of the nut by displacement of the location of said each lever closer to the structure; and causing rotation of the nut due to the vertical motion of the nut; thereby causing rotation of the third hollow structure.

* * * * *